United States Patent [19]

Saito et al.

[11] Patent Number: 4,958,934
[45] Date of Patent: Sep. 25, 1990

[54] METHOD AND APPARATUS FOR CONTINUOUS MELTING OF GELLED SUBSTANCE

[75] Inventors: Hirokazu Saito; Seiichi Yukawa; Takashi Sato; Kiyoyuki Ushirokozi; Nobutoshi Aoyagi; Tomio Suzuki; Minoru Tanaka, all of Kanagawa, Japan

[73] Assignee: Fuji Photo Film Co., Ltd., Kanagawa, Japan

[21] Appl. No.: 45,992

[22] Filed: May 4, 1987

[30] Foreign Application Priority Data

May 2, 1986 [JP] Japan ................................ 61-100998

[51] Int. Cl.⁵ ............................................ B01F 15/06
[52] U.S. Cl. .................................... 366/145; 366/144; 366/194; 366/141; 210/179
[58] Field of Search ................. 366/144, 145, 149, 22, 366/24, 241, 243, 276-279, 194-196, 141, 601, 18, 77, 98; 210/179, 175, 319, 383; 222/146.2

[56] References Cited

U.S. PATENT DOCUMENTS

| | | | |
|---|---|---|---|
| 2,028,935 | 1/1936 | Knoll | 210/179 |
| 2,075,403 | 3/1937 | Nester | 366/144 |
| 2,398,725 | 4/1946 | Schutte | 210/383 X |
| 2,448,927 | 9/1948 | Fischer | 366/144 X |
| 3,924,840 | 12/1975 | Nelson | 366/145 X |
| 4,049,244 | 9/1977 | Hedrich | 366/145 X |
| 4,325,641 | 4/1982 | Babus et al. | 366/24 X |
| 4,417,980 | 11/1983 | Baur et al. | 210/383 X |
| 4,479,590 | 10/1984 | Slautterback | 366/279 X |
| 4,498,783 | 2/1985 | Rudolph | 366/141 X |
| 4,668,096 | 5/1987 | Saaty | 366/144 X |

FOREIGN PATENT DOCUMENTS

| | | |
|---|---|---|
| 3221056 | 12/1983 | Fed. Rep. of Germany ...... 366/144 |
| 3406600 | 8/1984 | Fed. Rep. of Germany . |
| 44-9495 | 5/1969 | Japan . |
| 49-34816 | 9/1974 | Japan . |
| 51-1738 | 1/1976 | Japan . |
| 55-159928 | 12/1980 | Japan . |
| 57-169743 | 10/1982 | Japan . |
| 4137 | of 1891 | United Kingdom ................ 210/179 |

Primary Examiner—Harvey C. Hornsby
Assistant Examiner—Stephen F. Gerrity

[57] ABSTRACT

A melting tank for melting a gelled substance charged therein. The walls of the tank are heating. A first agitating blade agitates the bulk of the gelled substance to promote heat exchange with the walls. A second agitating blade is located closely adjacent a screen separating the gelled substance from a port at the bottom of the tank that is left open during agitation. Thereby, the melt flows down the walls of the tank and flows through the screen to the port.

7 Claims, 2 Drawing Sheets

METHOD AND APPARATUS FOR CONTINUOUS MELTING OF GELLED SUBSTANCE

BACKGROUND OF THE INVENTION

1. Field of the Invention

The present invention relates to a method and apparatus for continuously melting a gelled substance. By utilizing this method and apparatus, substances such as photographic emulsions and other emulsified products that are prepared in the process of manufacturing photographic materials and which have experienced a change from a sol to a gel state as a result of temperature variation can be restored to the initial sol (molten) state.

2. Background of the Invention

In the prior art process of manufacturing photographic materials, photographic emulsions, matting agents and other emulsified products prepared in a sol state are cooled to a gel state and stored at low temperature. In order to coat these emulsified products onto a support, they are restored to their initial sol state by melting the gelled prepared products, as required. Two methods are commonly used to melt such gelled substances. According to one method which is conducted in a batch system, a heat-melting device is placed on the gelled substance in a container and the resulting melt is withdrawn from the container (see, for example, Japanese Patent Publication Nos. 9495/1969 and 1738/1976). In the other method, the gelled substance is continuously fed over a heating surface or into a heating tube, which are moved to promote heat transfer through the gelled substance so that it melts (see, for example, Japanese Patent Publication No. 34816/1974 and Unexamined Published Japanese Patent Application No. 159928/1980).

The method of melting a gelled substance in a batch system has the following problems. Heating of the gelled substance is not uniform and part of it becomes excessively hot while other parts take a long time to completely melt. Also, the amount of gelled substance that can be melted by this method is small and the necessary amount cannot be continuously melted or conveyed when needed. The continuous method has been developed with a view to solving these problems but it still suffers from the following problems. First, the heating area available is limited and if the temperature is increased to an extreme level with a view to achieving a significant increase in the melting speed, the properties of the gelled substance are degraded, the breadth of control of the melting speed is small and the necessary amount of gelled substance cannot be continuously melted or conveyed in accordance with need. Secondly, it takes much time to clean the heating surface. Thirdly, it is impossible to prevent the unmelted substance from flowing out of the container.

SUMMARY OF THE INVENTION

The present invention has been accomplished in order to solve the aforementioned problems of the prior art methods.

An object of the present invention is to provide a method of melting a gelled substance that, is efficient, permits the necessary amount of gelled substance to be continuously melted and conveyed in accordance with need, and which permits the melt to flow out of the container at a constant temperature while preventing the unmelted substance from flowing out of the container.

Another object of the present invention is to provide an apparatus for continuously melting a gelled substance that can be cleaned easily and which allows for easy maintenance.

In one aspect, the present invention provides a continuous method for melting a gelled substance which comprises supplying a melting tank with the gelled substance and melting it by means of both heating provided from the tank wall and agitation of the gelled substance in the tank. This method is further characterized as follows. The gelled substance is charged into the melting tank at an unspecified time. The gelled substance is melted by first means of agitation that imparts motion to the entire portion of the gelled substance in the tank and by second means of agitation that imparts motion to that portion of the gelled substance which is located around a melt delivery port on the bottom of the tank. The resulting melt is continuously separated from the gelled substance in an area around the melt delivery port which is open at all times during the melting operation. The separated melt is then permitted to flow out of the tank through the delivery port.

In another aspect, the present invention provides an apparatus for continuously melting a gelled substance in a melting tank by means of both heating provided from the tank wall and agitation of the gelled substance in the tank. This apparatus is further characterized as follows. The agitating means for melting the gelled substance has a first agitating blade positioned in the center of the tank and a second agitating blade positioned along the surface of a melt delivery port. A screen for separating the resulting melt from the gelled substance is provided at the melt delivery port which is open at all times during the melting operation.

The melting tank used in the present invention is equipped with a heating jacket so that a heating medium can be supplied over the entire surface of the tank wall to impart heat to the gelled substance in the tank.

DETAILED DESCRIPTION OF THE PREFERRED EMBODIMENTS

The agitation effected in the present invention and the means for accomplishing it are characterized in that a first agitating blade, typically disposed in the center of a tank, is used to impart motion to the entire portion of the gelled substance in the tank while a second agitating blade, typically disposed along the surface of a melt delivery port on the bottom of the tank, is used to impart motion to that portion of the gelled substance which is situated around said delivery port. The agitating blade disposed in the center of the tank may be of any type but, desirably, it is of a type that is capable of imparting motion to the entire portion of the gelled substance in the tank without comminuting it to fine particles. For this purpose, a paddle-type blade is preferably caused to rotate with its direction cyclically changed through an angle of 120° to 90°. In order to maximize the area of the melt delivery port, the screen to be disposed above it preferably has a semi-spherical shape and the agitating blade that is disposed along the surface of this port must move along the semi-circular screen. To this end, it is preferable to select a paddle agitator that is composed of 2 to 4 semi-circular blades and which is capable of moving the gelled substance on the screen without comminuting it into fine particles.

The melt delivery port provided on the bottom of the tank is left open throughout the melting operation so that the melt forming in the tank can be continuously withdrawn and conveyed to the next step without staying in the tank. To this end, a T-type tank valve is provided under the delivery port and is allowed to remain open to an appropriate extent throughout the melting operation. The screen provided around the delivery port for separating the melt form the gelled substance in the tank is advantageously made of stainless steel or plastics. The size of the openings in this screen typically ranges from 0.5 to 1 mm.

In the present invention, the amount of melt continuously flowing out of the tank after it has been separated from the gelled substance must be checked throughout the operation. This may be achieved by direct measurement of the melt flow coming out of the tank but a more practical method is to constantly check the weight of the gel-filled tank by a suitable device such as a load cell. The amount of the flowing melt is commonly controlled by adjusting the temperature and flow rate of the heating medium circulating through the heating jacket enclosing the melting tank. For the purposes of the present invention, it is effective to control the rotational speed of the agitating blades in the tank. This method may be combined with the conventional technique (i.e., adjustment of the temperature and flow rate of the heating medium).

Figure 1:
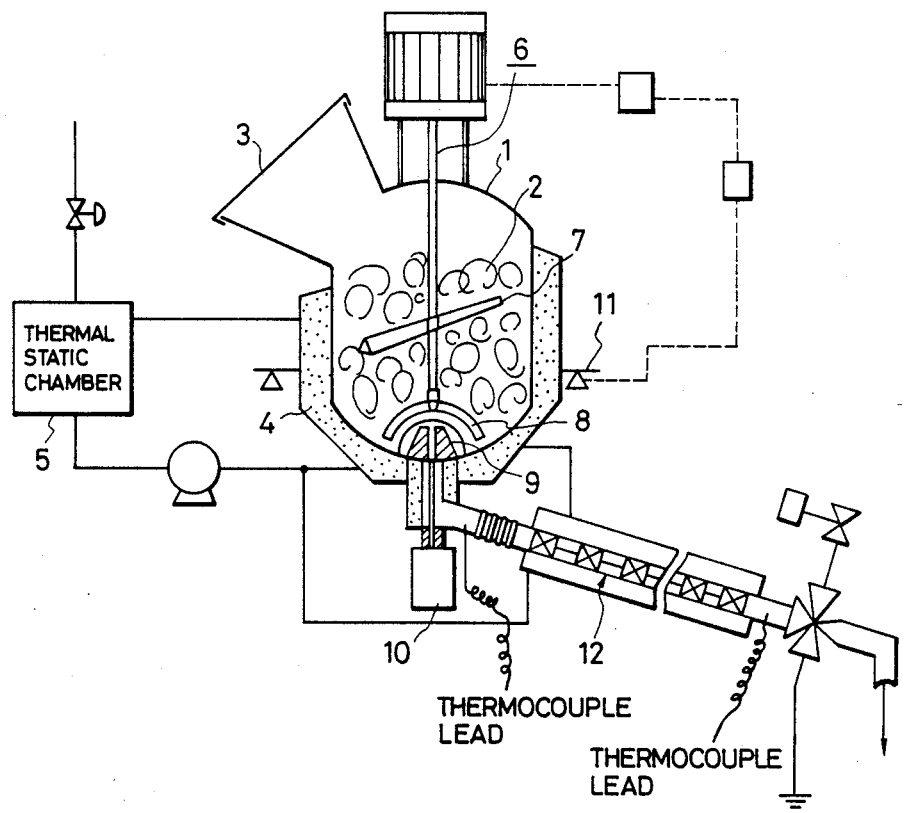
FIG. 1 is a schematic drawing of an embodiment of the present invention which is applied to an apparatus for continuously melting gelled substances to be used in the production of photographic material.

An embodiment of the present invention is hereunder described with reference to FIG. 1. A melting tank 1 having a capacity of 500 liters is charged through an inlet 3 with gelled substances 2 for use in the preparation of photographic materials (i.e., emulsions and emulsified products having a gelatin content of 4–25%). The tank wall is enclosed with a jacket 4 through which a temperature-adjusted heating medium supplied from a thermostatic chamber 5 is circulated so as to heat the surface of the tank wall to a temperature between 40° and 80° C. so as to melt the gelled substance 2 in the tank 1. An agitator 6 is provided in order to increase the melting speed by providing better contact between the gelled substances 2 and the surface of the tank wall and to allow the resulting melt to rapidly flow down the wall to the bottom of the tank 1. According to one characteristic feature of the present invention, the agitator 6 has two types of agitating blades, a central agitating blade unit 7 and a lower agitating blade unit 8. The central blade unit 7 is formed with a paddle-shaped blade, and the lower unit 8 is composed of four semi-circular paddle blades, two of which are illustrated in FIG. 1. Either type of agitator blade is typically rotated at 5–200 rpm if the rotation is unidirectional, and at a rate of 10–500 cycles per minute if the direction of rotation is changed cyclically through an angle of 180°–90°. The central agitating blade unit 7 imparts motion to the entire portion of the gelled substances 2 in the tank and, as a result, the heat transfer from the tank wall is accelerated to increase the melting efficiency and to help the resulting melt rapidly flow down the tank wall to reach the bottom of the tank. The lower agitating blade unit 8 imparts motion to the gelled substances 2 building up on the surface of a metal screen 9 provided over the melt delivery port, thereby increasing the mobility of the resulting melt. As a result, the melt that has flowed down the tank wall to the bottom of the tank 1 will not stay there and will pass through the metal screen 9 to flow out of the tank through the delivery port. The delivery port is equipped with a T-type tank valve 10 which is kept open to an extent that matches the flow rate of melt coming out of the tank.

The flow rate of the molten effluent can be controlled by several methods As one example, the weight of the tank 1 is at least partially supported by a load cell 11 and the temperature or the flow rate of the heating medium being supplied from the thermostatic chamber 5 to the jacket 4 is adjusted or the rotational speed of the agitating blades 7 and 8 in the tank is varied by controlling the motor of the agitator 4. By either method, the flow rate of the melt can be controlled to lie within the range of 0 to 16 liters per minute. These methods are also effective for the purpose of informing the operator of the time when an additional amount of gelled substance 2 should be charged into the melting tank 1. The load cell 11 may be installed in such a manner that the total weight of the melting tank and associated parts can be supported by the load cell 11, with flexible tubes being used not only for the pipes connecting the heating medium to and from the thermostatic chamber 5 but also for the drain pipe through which the melt is discharged out of the tank 1. The temperature of the melt can be controlled more precisely by installing a motionless mixer 12 with a heating jacket on the pipeline connecting to a tank provided for preparing emulsion coating solutions.

According to one feature of the present invention, two types of agitating blade units 7 and 8 are used. The central agitating blade unit 7 imparts motion to the entire portion of the gelled substance in a melting tank so as to accelerate not only the heat transfer from the heating surface of the tank wall and the gelled substance by a degree sufficient to promote its melting but also to promote the descent of the resulting melt down the tank wall. As a result, the overall rate of melting of the gelled substance is significantly improved. The lower agitating blade unit 8 imparts motion to the gelled substance on the screen 9 attached above the melt delivery port so that the melt separated from the gelled substance by the screen will flow out of the tank efficiently through the delivery port without permitting the melt to become stagnant on the bottom of the tank or introducing any instability in the amount of effluent leaving the tank.

According to the other feature of the present invention, the melt delivery port provided on the bottom of the tank is left open to an appropriate extent throughout the melting operation, so that the melt forming in the tank will immediately leave it without staying on its bottom. In addition, the screen 9 mounted above the delivery port ensures efficient separation between the melt and the gelled substance. As a result, the melt can be continuously conveyed to the next stage while preventing any unmelted substance from flowing out of the tank, with the attendant advantage of providing ease in controlling the temperature of the melt.

Because of the features described above, the melt forming in the tank will immediately flow out of the tank from its bottom, and the amount of melting can be detected in an easy and reliable manner by either monitoring the amount of effluent leaving the tank or measuring the weight of the tank containing the gelled substance. The rate of melting of the gelled substance is remarkably high because of two principal reasons, viz., the large heating area provided by the melting tank and the accelerated heat transfer from this heating area accomplished by agitation of the gelled substance in the tank. Based on the detection of the amount of melting achieved by the methods described above, more precise and reliable control of the amount of melting can be realized by adjustment of appropriate parameters such as the temperature and flow rate of the heating medium circulating through the heating jacket or the rate of agitation of the gelled substance in the tank. As a consequence, the necessary amount of gelled substance can be continuously melted and conveyed to a subsequent stage (e.g. the coating zone) whenever needed.

EXAMPLE

Figure 2:
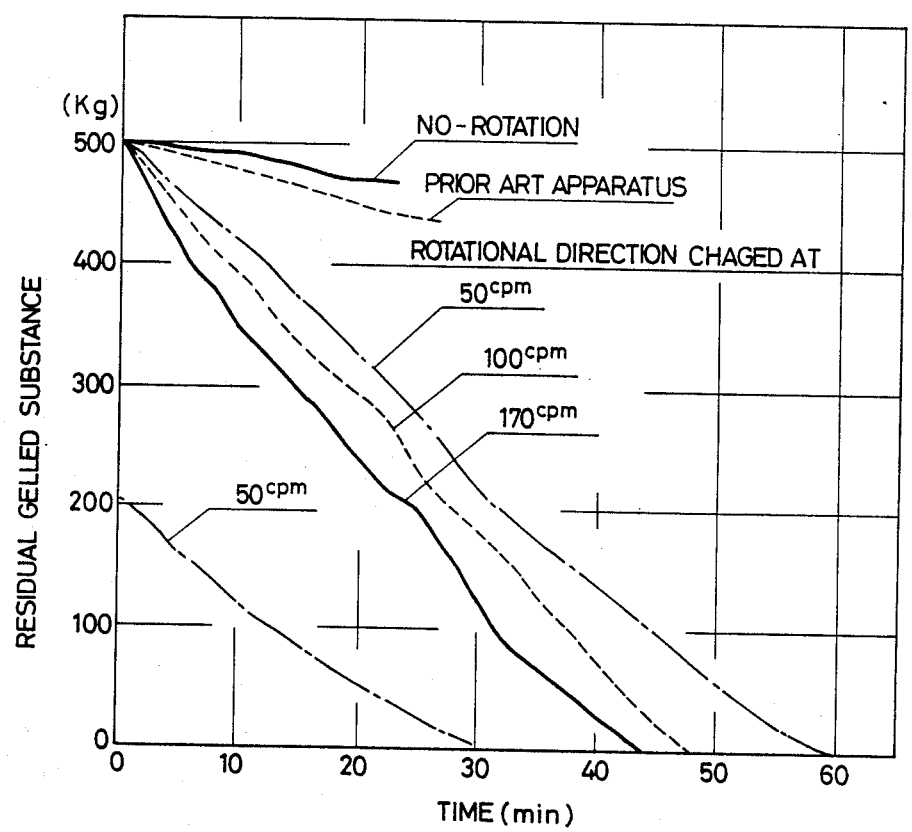
FIG. 2 is graph showing curves that depict the relationship of time vs. the residual amount of gelled substances in the melting tank in the apparatus of the present invention which was used in an experiment conducted to melt the gelled substances with varying rotational speeds of agitating blades.

Using a model of the apparatus of the present invention for continuously melting gelled substances to be used in the preparation of a photographic material (see FIG. 1), an experiment was conducted to obtain curves showing the relationship between the rotational speed of an agitator and the melting speed of the gelled substances in the melting tank for varying rotational speeds of the agitator. The results of the experiment are shown in FIG. 2. When the agitating blades were rotated with the rotational direction being changed at a rate of 50 cycles per minute, it took about 60 minutes to completely melt 500 kg of gelled substances. Of the rotational speed was increased to 170 cycles per minute, the melting of the gelled substances was completed in about 43 minutes. The melting speed in this case was 5 to 6 times as fast as the value that could be attained by the prior art system disclosed in Japanese Patent Publication No. 31447/1975. By detecting and controlling the amount of melting on the basis of the large breadth of adjustability of the melting speed, it was possible for the gelled substances in the tank to be continuously melted and conveyed in amounts that just coincided with the necessary quantity of coating solutions to be prepared in the next stage.

In the present invention, agitation of a gelled substance in a melting tank is effected at two positions, one being at the center of the tank and the other being along the surface of a melt delivery port provided on the bottom of the tank. A screen or some other appropriate device is disposed around this delivery port for the purpose of separating the resulting melt from the gelled substance and allowing it to flow out of the tank. These features contribute to a significant improvement in the rate of melting of the gelled substance.

In addition, the resulting melt will readily flow out of the tank without staying on its bottom and the amount of melting can be detected in an accurate and precise manner. This feature, coupled with the increase in melting speed mentioned in the previous paragraph, enables the molten effluent to be continuously conveyed to a subsequent stage, with the amount of melting being precisely controlled as required through adjustment of the temperature and flow rate of the heating medium circulating through the heating jacket around the tank, or the rotational speed of agitating blades in the tank.

In the prior art, the unmelted portion of the gelled substance will often flow out of the melting tank. This problem is absent form the present invention and the molten effluent can be conveyed to a subsequent stage at a constant temperature. This offers a particular benefit to the manufacturer of photographic materials because, for one thing, the method and apparatus for continuously melting gelled substances and conveying the molten product to the coating zone are streamlined to a greater extent. For another reason, the absence of excessive heating and time-dependent change of the molten effluent leads to significant improvement in the quality of the final photographic product. An addition advantage of the present invention is the ease with which cleaning and servicing of the melting apparatus can be undertaken.

We claim:

1. A continuous method for melting a gelled substance, comprising the steps of:
    charging a gelled substance into a tank;
    heating walls of said tank;
    agitating a central portion of said gelled substance charged into said tank, thereby imparting motion to an entire portion of said charged gelled substance;
    continuously separating a melt from the charged gelled substance by the combination of separately agitating a portion of said charged gelled substance located in an area around a melt discharge port and a separation screen, and simultaneously filtering said melt from said gelled substance using said screen;
    discharging said melt through said discharge port;
    measuring a flow of said melt out of said tank; and
    in response to said measuring step, controlling the rate of agitation of said gelled substance in said two agitating steps.

2. An apparatus for continuously melting a gelled substance, comprising:
    a tank into which a gelled substance can be charged;
    a discharge port located at the bottom of said tank;
    a screen located in said tank above said discharge port;
    means for heating walls of said tank;
    agitating means including a first blade positioned in a center of said tank and a second blade positioned adjacent to a top of said screen, said screen and said second blade acting in combination to aid in the separation of said melt from said gelled substance in the vicinity of said discharge port, said discharge port being continually left open throughout a continuous melting operation;
    a measuring device for detecting a change in weight of said tank so as to determine the flow rate of said melt through said discharge port; and
    control means for controlling the speed of agitation of said agitating means in response to said flow rate.

3. A melting apparatus as recited in claim 2, wherein said measuring device is a load cell.

4. A melting apparatus as recited in claim 2, wherein said screen has a partially spherical shape and said second blade has a partially circular shape conforming to said screen.

5. A melting apparatus as recited in claim 4, wherein said first blade extends radially from a rotational axis of said agitating means.

6. A melting apparatus as recited in claim 5, wherein said first and second blades are rotationally linked and are controlled to rotate in alternatingly opposite directions.

7. A melting apparatus as recited in claim 6, further comprising a measuring device for detecting a weight of said tank and being operatively connected with at least one of said heating means and said agitating means.

* * * * *